March 17, 1942.    J. WEBER, JR., ET AL    2,276,552
SELF-SHANK BUTTON CHUCK
Filed Dec. 18, 1939
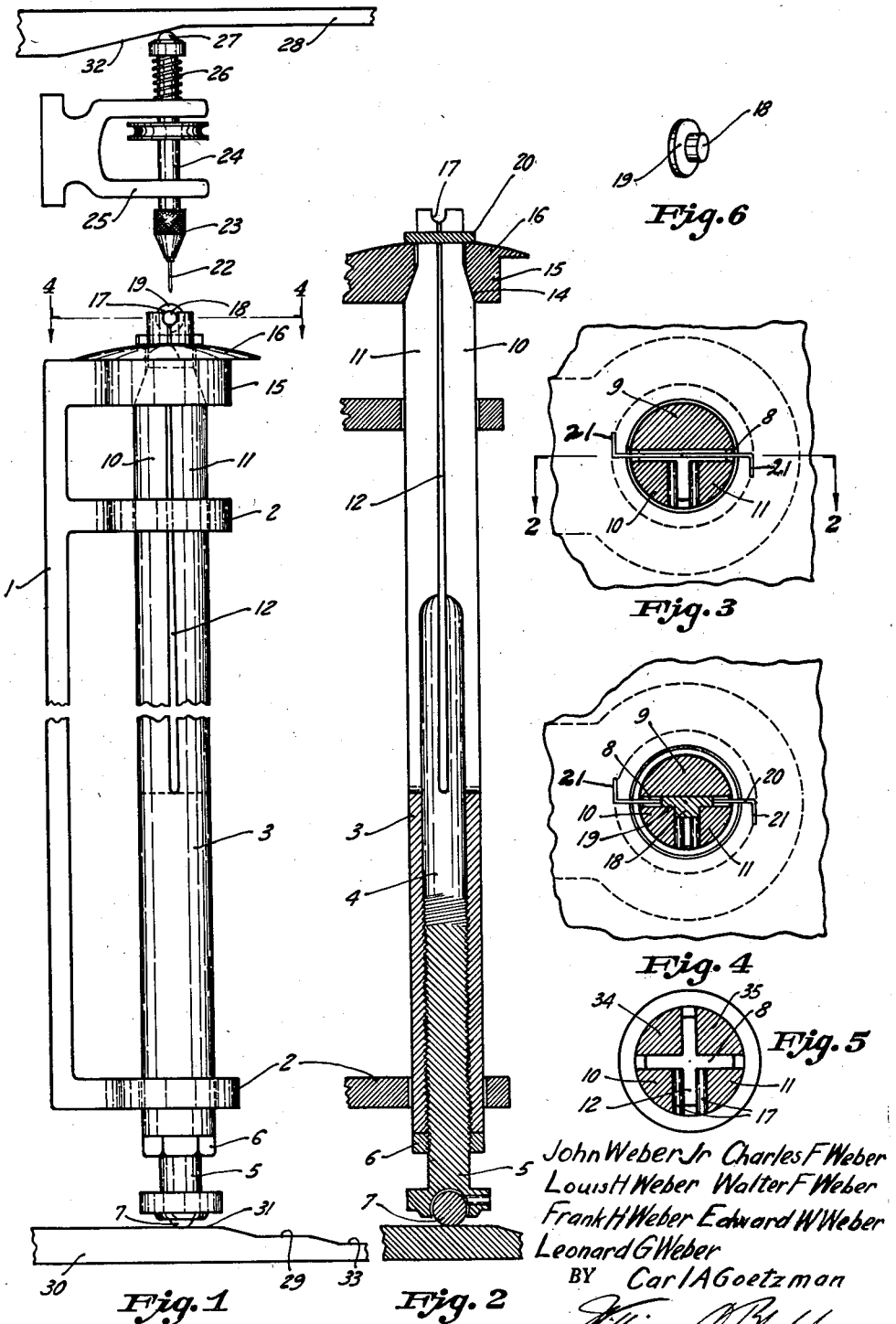
John Weber Jr  Charles F Weber
Louis H Weber  Walter F Weber
Frank H Weber  Edward W Weber
Leonard G Weber
BY  Carl A Goetzman Patented Mar. 17, 1942

2,276,552

UNITED STATES PATENT OFFICE 2,276,552

SELF-SHANK BUTTON CHUCK

John Weber, Jr., Charles F. Weber, Louis H. Weber, Walter F. Weber, Frank H. Weber, Edward W. Weber, Leonard G. Weber, and Carl A. Goetzman, Muscatine, Iowa Application December 18, 1939, Serial No. 309,860

1 Claim. (Cl. 279—51)

The present invention relates to button drilling machines for use in the drilling of self-shank buttons.

Prior to this invention, most of the self-shank buttons on the market in this country have been imported from countries in which the cost of labor is exceedingly low since heretofore no commercially successful machine has been devised by which this type of buttons could be drilled. Thus, heretofore, buttons of this type have been drilled by hand in the indicated foreign countries without substantial competition in this country.

One of the primary obstacles in the designing of machinery for drilling self-shank buttons has been in providing a chuck which will hold a button of this type in a position in which it may be drilled, with the button held sufficiently rigidly that it cannot move and thereby break the drill. In the early attempts which we made in building machines for this purpose, drill breakage was common, due to movement of the button, even the slightest movement during drilling generally causing breakage of the drill.

It is accordingly an object of the present invention to provide a machine for the drilling of self-shank buttons in which a button blank is held securely in a chuck in a position in which the shank of the blank is in a position readily available for drilling by the drill of the machine. A further object is the provision of a chuck specially adapted to the holding of self-shank button blanks with the shank in position readily available for drilling. Other objects and advantages will be apparent from the following description of this invention, taken in conjunction with the accompanying drawing in which:

Fig. 1 is an elevation showing the chuck in closed position with a button blank in held position and with the drill of the machine in idle position;

Fig. 2 is a vertical medial section of the chuck and associated operating parts, taken on the line 2—2 in Fig. 3;

Fig. 3 is a horizontal section of the chuck without a blank in place, taken on the line 4—4 in Fig. 1;

Fig. 4 is a horizontal section of the chuck with a blank in place, taken on the line 4—4 in Fig. 1;

Fig. 5 is a section similar to that of Fig. 3 but of a modified form of chuck jaws; and Fig. 6 is an isometric view of a self-shank button blank.

In the machine shown, a supporting frame 1 is provided with a pair of guides 2 having circular openings therein of a size to receive chuck bar 3. The chuck bar, which is generally circular in section, has a circular opening 4 extending from its lower end well up into the bar. An adjustable cam follower 5 threadedly engages in the opening 4 and is provided with a lock nut 6, to lock the cam follower in adjusted position longitudinally of the chuck bar. An antifriction ball bearing 7 is rotatably carried in an opening in the lower end of the cam follower.

Slots, which extend from the upper end of the chuck bar to a point below the upper end of the opening 4, divide the bar into a plurality of chuck jaws. The slot 8 separates the jaw 9 from a pair of jaws 10 and 11, which are separated by a slot 12. The upper end of the chuck bar is reduced in size so as to provide an inclined shoulder 14 on each of the jaws. This upper end of the chuck bar extends through a collet 15 which is provided with a face complemental to the shoulder 14 and which is fixed with respect to the supporting frame 1, preferably the collet being formed integrally with the frame. The collet is provided with a deflector 16 to direct finished buttons away from the chuck structure. The collet is of an internal size large enough to accommodate the reduced end portion of the jaws in open position.

The jaws 10 and 11 are provided with a notch 17 in line with the slot 12 and of a size to receive the shank 18 of a self-shank button blank 19 when the jaws are in open position. Further, the jaw 9 is spaced from the jaws 10 and 11 sufficient in open position of the chuck to receive the head of the button. In order to eject finished buttons from the chuck, an ejector 20 is positioned in the slot 8 above the deflector 16, the ends 21 of the ejector resting on the deflector and bent over to prevent the ejector from sliding out of the slot lengthwise.

A drill 22 is rotatably carried by the machine for movement longitudinally of the chuck bar whereby, after the blank 19 is clamped in position in the chuck, the drill cuts a hole downwardly through the shank, transversely thereof, and just out of the farther side. The drill 22 may suitably be carried by a chuck 23 mounted on the lower end of a shaft 24 which is guided and carried for rotation by a support 25. A pulley is provided to drive the shaft 24 and a spring 26 is provided to raise the drill and maintain friction bearing 27 at the upper end of the shaft in contact with cam 28.

In operation, a blank is placed in the chuck, the chuck being in open position, that is, with the bearing 7 resting on the intermediate portion 29 of the cam 30. In this position, the cam bar has raised the chuck bar relatively to the ejector 20 enough to allow a button to be positioned in the chuck. The head of the button blank is placed in the slot 8 and the shank in the notch 17. The cam 30 is then moved with respect to the chuck bar to the position shown in which the bearing 7 rests on the high portion 31 of the cam 30. In this position, the chuck bar is raised, the collet pressing the jaws 9, 10, and 11 together. The cam follower 5 is so adjusted in the bar that, in this position, the head of the button blank is gripped between the jaw 9 and each of the jaws 10 and 11, and so adjusted, also, that the shank is gripped between the jaws 10 and 11.

With the blank then in position, the cam 28 is moved with respect to the drill assembly whereby the drill is moved downwardly by the inclined face 32 of cam 28, the drill being constantly driven. When drilling is completed, the drill is allowed to move upwardly. The cam 29 is then moved with respect to the chuck bar until the bearing 7 rests on the low portion 33 of the cam. This lowers the chuck bar, resulting in ejection of the drilled button by ejector 20.

The drill assembly and the chuck assembly may be moved with respect to the cams by structure well known in the button industry, such machines being in common use, particularly for moving polishing tools against chuck-held button blanks.

It is to be understood that while a three-jaw chuck has been shown, the slot 12 may be extended all the way through the chuck bar, forming a four-jaw chuck, having a pair of jaws 34, 35 instead of the jaw 9, as shown in Fig. 5. Also, it should be understood that within the scope of this invention the slot 12 may be entirely omitted, though we prefer to employ the slot in order to obtain perfect centering of the shank and a gripping action on the shank.

Having now described our invention, we claim:

A chuck for holding self-shank button blanks for drilling, comprising a plurality of jaws and a collet, the jaws and collet being relatively movable longitudinally one with respect to the other, for effecting movement together and apart of said jaws, there being an opening between said jaws, which, in open position of the chuck, is sufficiently large to permit the insertion of the head of a self-shank button blank with the head substantially coplanar with the opening and which, in closed position of the chuck, is sufficiently small that the chuck jaws grip the head of the blank, said chuck jaws being provided with a notch extending from said opening in a direction transversely of said jaws a distance sufficient to accommodate the shank of said blank, and said notch extending from the jaw end of said chuck longitudinally thereinto, whereby a blank may be moved longitudinally of the chuck, with the faces of the chuck jaws forming the notch, positioning the blank, both longitudinally and transversely of the chuck, and preventing slippage of the blank in the chuck, and a member carried by said collet extending transversely of the chuck into and through said opening and movable upon release of the chuck into engagement with said blank to lift the released blank out of the chuck and upon reverse movement movable to a position out of blank-engaging relation prior to gripping engagement of the blank by the chuck.

JOHN WEBER, JR.
CHARLES F. WEBER.
LOUIS H. WEBER.
WALTER F. WEBER.
FRANK H. WEBER.
EDWARD W. WEBER.
LEONARD G. WEBER.
CARL A. GOETZMAN.